US012030084B2

(12) United States Patent
Hua et al.

(10) Patent No.: US 12,030,084 B2
(45) Date of Patent: Jul. 9, 2024

(54) ULTRASONIC TRANSDUCER UNIT AND MANUFACTURING METHOD THEREOF

(71) Applicant: BOE TECHNOLOGY GROUP CO., LTD., Beijing (CN)

(72) Inventors: Hui Hua, Beijing (CN); Yanzhao Li, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 409 days.

(21) Appl. No.: 17/427,358

(22) PCT Filed: Oct. 30, 2020

(86) PCT No.: PCT/CN2020/125147
§ 371 (c)(1),
(2) Date: Jul. 30, 2021

(87) PCT Pub. No.: WO2022/088015
PCT Pub. Date: May 5, 2022

(65) Prior Publication Data
US 2022/0347721 A1 Nov. 3, 2022

(51) Int. Cl.
*B06B 1/02* (2006.01)

(52) U.S. Cl.
CPC .................................. *B06B 1/0292* (2013.01)

(58) Field of Classification Search
CPC ...... B06B 1/0292; B06B 2201/51; H04R 7/00
See application file for complete search history.

(56) References Cited

U.S. PATENT DOCUMENTS

2020/0123005 A1 4/2020 Sumida et al.
2022/0347721 A1* 11/2022 Hua ......................... H04R 7/00

FOREIGN PATENT DOCUMENTS

| | | | | | |
|---|---|---|---|---|---|
| CN | 102728535 | A | | 10/2012 | |
| CN | 111003684 | A | | 4/2020 | |
| CN | 111377389 | A | | 7/2020 | |
| CN | 113800465 | A | * | 12/2021 | |
| CN | 114698410 | A | * | 7/2022 | B06B 1/0292 |
| DE | 102016209489 | B3 | | 8/2017 | |
| EP | 1761104 | A1 | * | 3/2007 | A61B 8/4483 |
| JP | 2008193652 | A | * | 8/2008 | B06B 1/0292 |
| JP | 4796543 | B2 | * | 10/2011 | B06B 1/0292 |
| WO | WO-2022088015 | A1 | * | 5/2022 | B06B 1/0292 |

OTHER PUBLICATIONS

Translation of CN-113800465 (Year: 2021).*

* cited by examiner

*Primary Examiner* — Daniel Pihulic
(74) *Attorney, Agent, or Firm* — HOUTTEMAN LAW LLC

(57) ABSTRACT

The present disclosure provides an ultrasonic transducer unit and a manufacturing method thereof. The ultrasonic transducer unit includes a substrate, a first electrode arranged on the substrate, an insulating layer arranged on the first electrode, a vibrating film arranged on the insulating layer, a closed cavity being between the vibrating film and the insulating layer, and a second electrode arranged on the vibrating film. The vibrating film is made of a photoresist. The ultrasonic transducer unit disclosed by the present disclosure adopts the photoresist as a material of the insulating layer and/or the vibrating film, so that the ultrasonic transducer unit with better performance can be obtained.

18 Claims, 8 Drawing Sheets

ULTRASONIC TRANSDUCER UNIT AND MANUFACTURING METHOD THEREOF

TECHNICAL FIELD

The present disclosure relates to the technical field of semiconductors, and in particular to an ultrasonic transducer unit and a manufacturing method thereof.

BACKGROUND

An acoustic impedance of a Capacitive Micromachined Ultrasonic Transducer (CMUT) manufactured by using a Micro Electro Mechanical System (MEMS) process is low and adjustable, so that an impedance matching layer is not required to be included when an ultrasonic probe is manufactured. As a result, the difficulty in manufacturing the ultrasonic probe is reduced, and the bandwidth thereof is also increased. The process for manufacturing the CMUT is compatible with a process for manufacturing a CMOS integrated circuit, generally includes a photolithography process, adopts a photoresist to match with a patterning process so as to manufacture the ultrasonic probes with a high integration level and in a large-scale array, and can meet the increasing requirements for information acquisition in the field of clinical medicine.

SUMMARY

The present disclosure provides an ultrasonic transducer unit and a method for manufacturing the same.

The ultrasonic transducer unit includes a substrate; a first electrode arranged on the substrate; a vibrating film arranged on the first electrode; and a second electrode arranged on the vibrating film, wherein an overlapping region exists between an orthographic projection of the first electrode on the substrate and an orthographic projection of the second electrode on the substrate, and a closed cavity is formed between the vibrating film and the first electrode in the overlapping region, wherein a material of the vibrating film is a photoresist.

In one embodiment, the ultrasonic transducer unit further includes a via hole penetrating through the vibrating film and communicating with the cavity, and a filling pattern filling the via hole.

In one embodiment, the ultrasonic transducer unit further includes an insulating layer arranged between the first electrode and the cavity, and a material of the insulating layer is a photoresist.

In one embodiment, the photoresist includes a DL-1000-C photoresist or a SU8 photoresist.

In one embodiment, a material of the vibrating film is the DL-1000-C photoresist, and a thickness of the vibrating film is greater than or equal to 1.5 μm and less than or equal to 3 μm; or a material of the vibrating film is the SU8 photoresist, and a thickness of the vibrating film is greater than or equal to 5 μm and less than or equal to 40 μm.

In one embodiment, a material of the insulating layer is the DL-1000-C photoresist, and a thickness of the insulating layer is greater than or equal to 1.5 μm and less than or equal to 3 μm; or the insulating layer is made of the SU8 photoresist, and a thickness of the insulating layer is greater than or equal to 5 μm and less than or equal to 40 μm.

In one embodiment, a material of the filling pattern is amorphous silicon.

In one embodiment, the ultrasonic transducer unit further includes a first electrode lead arranged on the substrate and in a same layer as the first electrode, and electrically connected to the first electrode.

In one embodiment, an orthographic projection of the cavity on the substrate is at a first region of the substrate, the substrate further includes a second region surrounding the first region, at least a portion of the vibrating film and at least a portion of the insulating layer are in direct contact with each other in the second region; or the ultrasonic transducer unit further includes a support pattern which is between the vibrating film and the insulating layer and is in the second region.

In one embodiment, a material of the support pattern includes a photoresist.

The present disclosure also provides a method for manufacturing an ultrasonic transducer unit, including: forming a first electrode on a substrate; forming a sacrificial material pattern on the first electrode; forming a photoresist pattern on the sacrificial material pattern, wherein an overlapping region exists between an orthographic projection of the photoresist pattern on the substrate and an orthographic projection of the first electrode on the substrate; removing the sacrificial material pattern such that a closed cavity is formed between the photoresist pattern and the first electrode in the overlapping region; and forming a second electrode on the photoresist pattern such that an orthographic projection of the second electrode on the substrate at least partially overlaps with the overlapping region.

In one embodiment, a material of the photoresist pattern includes a DL-1000-C photoresist or a SU8 photoresist.

In one embodiment, the forming a sacrificial material pattern on the first electrode includes: forming a first photoresist layer on the first electrode; performing exposure, development and post-baking treatment on the first photoresist layer by using a mask plate to form an insulating layer; and forming the sacrificial material pattern on the insulating layer at least in the overlapping region.

In one embodiment, the forming a photoresist pattern on the sacrificial material pattern includes: forming a second photoresist layer on the sacrificial material pattern and on an exposed portion of the insulating layer; and performing exposure, development and post-baking treatment on the second photoresist layer by using a mask plate to form the photoresist pattern with at least one via hole penetrating through the second photoresist layer.

In one embodiment, the removing the sacrificial material pattern includes: removing the sacrificial material pattern through the at least one via hole; and forming a filling pattern in the at least one via hole.

In one embodiment, an orthographic projection of the cavity on the substrate is at a first region of the substrate, the substrate further includes a second region surrounding the first region, and the forming a sacrificial material pattern on the first electrode includes: forming a first photoresist layer on the first electrode; performing exposure, development and post-baking treatment on the first photoresist layer by using a mask plate to form an insulating layer; forming a third photoresist layer on the insulating layer, and performing exposure, development and post-baking treatment on the third photoresist layer to form a support pattern in the second region; and forming the sacrificial material pattern within the support pattern.

In one embodiment, the method further includes forming a first electrode lead in a same layer as the first electrode and electrically connected to the first electrode on the substrate while forming the first electrode on the substrate.

In one embodiment, the sacrificial material pattern includes a metal pattern of Mo or AlNd; and the removing the sacrificial material pattern includes removing the metal pattern of Mo or AlNd using phosphoric acid and/or sulfuric acid.

In one embodiment, a material of the insulating layer includes the DL-1000-C photoresist or the SU8 photoresist.

In one embodiment, a material of the support pattern includes the DL-1000-C photoresist or the SU8 photoresist.

BRIEF DESCRIPTION OF DRAWINGS

Embodiments of the present disclosure will be described in detail below with reference to the accompanying drawings.

DETAIL DESCRIPTION OF EMBODIMENTS

Figure 1A:
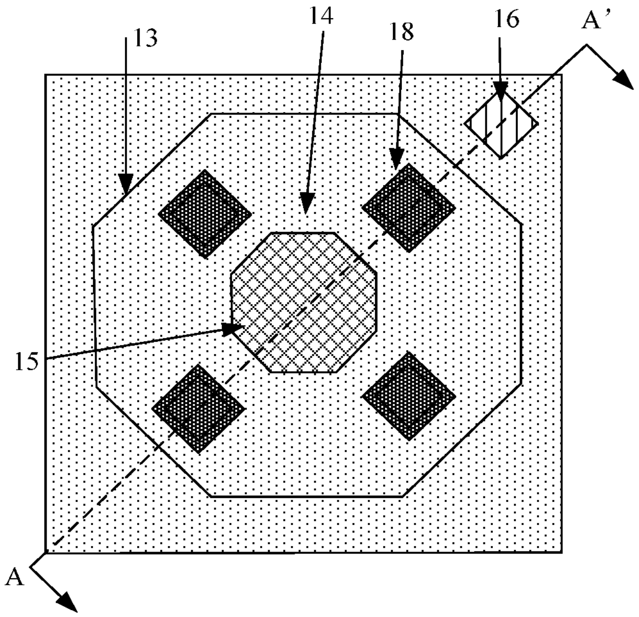
FIG. 1A shows a top view of an ultrasonic transducer unit according to an embodiment of the present disclosure.

The following detailed description of the present disclosure is provided, with reference to the accompanying drawings, to enable a person skilled in the art to better understand the technical solutions of the present disclosure.

An ultrasonic transducer unit according to an embodiment of the present disclosure may be a Capacitive Micro-machined Ultrasonic Transducer (CMUT), which generally includes a substrate (e.g., glass substrate), and a bottom electrode, an insulating layer, a vibrating film, and a top electrode sequentially formed on the substrate, wherein a closed cavity is formed between the insulating layer and the vibrating film. The ultrasonic transducer unit further includes a filling hole formed in the vibrating film when the cavity is formed and a filling layer formed after the filling hole is filled.

In the procedure of manufacturing the ultrasonic transducer unit, the insulating layer and the vibrating film are made of silicon nitride or silicon oxide in the related art, and the steps for forming the insulating layer and the vibrating film include deposition, photoresist coating, etching and photoresist removing.

For example, when the insulating layer is formed, a single layer of silicon nitride may be deposited using a Low Pressure Chemical Vapor Deposition (LPCVD) process, or a composite layer of silicon dioxide and silicon nitride may be deposited using a dry oxidation process and a Low Pressure Chemical Vapor Deposition (LPCVD) process. A polysilicon layer may be formed as a sacrificial material layer on the formed insulating layer and patterned, and a size of the patterned polysilicon layer determines a size of the cavity of the ultrasonic transducer unit, for example, determines a thickness of the cavity. A vibrating film made of silicon nitride with low residual stress is deposited on the patterned polysilicon layer and the exposed insulating layer, for example using a Low Pressure Chemical Vapor Deposition (LPCVD) process, the thickness of the vibrating film being selected, for example, from the range of 0.3 μm to 2 μm, which depends on the requirements for an output sound pressure of the ultrasonic transducer unit.

Next, in order to remove the patterned polysilicon layer to form the cavity, a photoresist is first coated on the vibrating film made of silicon nitride, then the vibrating film made of silicon nitride is etched by using a mask plate to form a corrosion hole, for example, the corrosion hole with a diameter of about 2 μm may be formed. The silicon nitride in the region of the corrosion hole is etched by using a dry etching process, so that the corrosion hole is directly communicated with the sacrificial material layer of polysilicon, and after this step, the photoresist needs to be removed.

As described above, in the related art, when forming the corrosion hole for forming the cavity in the vibrating film, a photoresist needs to be coated on the silicon nitride layer or the silicon oxide layer, and the steps of coating the photoresist, performing dry etching using a mask plate, and removing the photoresist are required to be performed, which is complex, takes up more production equipments and takes a long time.

Therefore, in the present disclosure, an ultrasonic transducer unit is provided, and a vibrating film of the ultrasonic transducer unit is made of a photoresist. That is, in the process of forming a vibrating film and then forming a cavity, only a photoresist layer needs to be coated, and after the photoresist layer is exposed by using the mask plate and developed, a corrosion hole can be formed in the photoresist layer, so that this process is greatly simplified, and the production efficiency is improved. Compared with the silicon nitride layer or the silicon oxide layer in the related art, the ductility of a material of the photoresist layer can be better, so that the vibrating film is not easy to damage in the working process of the ultrasonic transducer unit when the photoresist layer is used as the vibrating film of the ultrasonic transducer unit, and the formed ultrasonic transducer unit is more reliable.

Figure 1B:
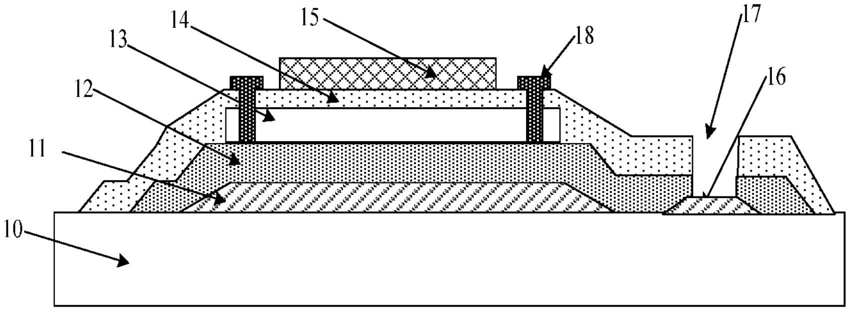
FIG. 1B shows a schematic cross-sectional view of an ultrasonic transducer unit according to an embodiment of the present disclosure.

FIGS. 1A and 1B respectively show a top view and a schematic cross-sectional view of an ultrasonic transducer unit according to the present disclosure, in which FIG. 1B is a cross-sectional view taken along a line AA' shown in FIG. 1A. The ultrasonic transducer unit includes: a substrate 10; a first electrode (bottom electrode) 11 provided on the substrate 10; an insulating layer 12 provided on the first electrode 11; a vibrating film 14 provided on the insulating layer 12; and a second electrode (top electrode) 15 arranged on the vibrating film 14, wherein an overlapping region (e.g., overlapping area) exists between an orthographic projection (i.e., orthogonal projection) of the first electrode 11 on the substrate 10 and an orthographic projection (i.e., orthogonal projection) of the second electrode 15 on the substrate 10, and the vibrating film 14 and the first electrode 11 form a closed cavity 13 in the overlapping region. The ultrasonic transducer unit further includes a via hole penetrating through the vibrating film 14 so as to communicate with the cavity 13, and a filling pattern 18 filling the via hole.

The through hole serves as a passage for etching liquid (i.e., an etchant) to form the cavity 13.

In the present disclosure, a material of the vibrating film 14 is a photoresist, such as a DL-1000-C photoresist or a SU8 photoresist. The DL-1000-C photoresist mainly contains polyimide, and is a positive photoresist, insoluble in an organic solvent and stable to a dilute acid, and contains a crosslinked polymer that can be cleaved by light to become soluble in a development solvent. The SU8 photoresist is a negative photoresist that forms cross-linked polymer and is not readily dissolved by the solvent after being exposed.

In contrast to the ultrasonic transducer unit in which the vibrating film is generally made of silicon nitride and/or silicon oxide in the related art, in the present disclosure, the photoresist is used as a material of the vibrating film. Because the photoresist has better ductility as a layer, the vibrating film is not easy to damage when the formed ultrasonic transducer unit repeatedly vibrates in the working process. The material and a thickness of the vibrating film determine the working frequency of the ultrasonic transducer unit. The thickness of the vibrating film made of photoresist is relatively large compared to the silicon nitride layer and/or silicon oxide layer at a given working frequency, which makes the vibrating film more reliable against repeated oscillations during operation.

When the material of the vibrating film is the DL-1000-C photoresist, the thickness of the vibrating film can be greater than or equal to 1.5 μm and less than or equal to 3 μm; when the material of the vibrating film is the SU8 photoresist, the thickness of the vibrating film can be greater than or equal to 5 μm and less than or equal to 40 μm. When the silicon nitride material is used to form the vibrating film in the related art, the thickness of the vibrating film is usually between 0.3 μm and 2 μm. Therefore, under a certain working frequency, the thickness of the vibrating film manufactured by adopting the photoresist material is relatively large, so that the product reliability of the ultrasonic transducer unit is further improved, and the vibrating film is prevented from being easily damaged due to repeated reciprocating movement.

In addition, the SU8 photoresist is a transparent material, and the SU8 photoresist is used as a material of the vibrating film of the ultrasonic transducer unit, so that the completely transparent ultrasonic transducer unit can be formed, and the ultrasonic transducer unit with a higher transmittance is formed.

The ultrasonic transducer unit of the embodiment shown in FIGS. 1A and 1B includes the insulating layer 12, but the present disclosure is not limited thereto. The ultrasonic transducer unit of the present disclosure may not include the insulating layer, and a closed cavity may be formed between the vibrating film and the first electrode.

In this disclosure, the material of the vibrating film is the photoresist. In order to avoid adverse effects on the vibrating film made of the photoresist material when forming the cavity, a metal material such as Mo (molybdenum) or AlNd (aluminum neodymium alloy) may be used as a sacrificial material. At this time, in order to avoid adverse effects on the first electrode 11, the insulating layer 12 made of a non-metallic material formed on the first electrode may avoid adverse effects on the first electrode in the processes used in forming and removing a sacrificial material later. In one embodiment, the insulating layer 12 may be made of a photoresist material (e.g., the DL-1000-C photoresist or the SU8 photoresist) as the vibrating film 14. When the material of the insulating layer 12 is the DL-1000-C photoresist, the thickness thereof may be greater than or equal to 1.5 μm and less than or equal to 3 μm; when the material of the insulating layer 12 is the SU8 photoresist, the thickness thereof may be greater than or equal to 5 μm and less than or equal to 40 μm.

As shown in FIG. 1B, the ultrasonic transducer unit further includes a via hole penetrating through the vibrating film 14 of the photoresist material to reach the cavity 13, and a filling pattern 18 is formed in the via hole. In one embodiment, the via hole may be filled with amorphous silicon, and the filling pattern may extend to the bottom of the cavity 13 through the via hole, as shown in FIG. 1B. However, the present disclosure is not limited to this, and for example, silicon nitride or the like may be used as the material of the filling pattern.

When an ultrasonic detection is performed, the ultrasonic transducer unit is firstly in an emission state and then switched to a receiving state. When in the emission state, a forward DC bias voltage VDC is applied between the second electrode 15 and the first electrode 11, and the vibrating film 14 is deformed to be bent downward (toward the first electrode 11) in an electrostatic field. On the basis, an alternating voltage VAC with a certain frequency f (the magnitude of the certain frequency f is set according to actual needs) is applied between the second electrode 15 and the first electrode 11, the vibrating film 14 is excited to reciprocate greatly (reciprocate in the direction close to the first electrode 11 and the direction far away from the first electrode 11) to realize the conversion from electric energy into mechanical energy, and the vibrating film 14 radiates energy to a medium environment to generate ultrasonic waves; a part of the ultrasonic waves can be reflected on a surface of an object to be detected and return to the ultrasonic transducer unit to be received and detected by the ultrasonic transducer unit. When the ultrasonic transducer unit is in the receiving state, only a DC bias voltage is applied between the second electrode 15 and the first electrode 11, so that the vibrating film 14 reaches static balance under the action of an electrostatic force and a restoring force of the vibrating film 14; and when sound waves are applied to the vibrating film 14, the vibrating film 14 is excited to vibrate, a cavity spacing (i.e., a thickness of the cavity) between the second electrode 15 and the first electrode 11 is changed, and a capacitance therebetween is changed, so that a detectable electric signal is generated, and detection of received ultrasonic waves can be realized on the basis of the electric signal.

The substrate 10 may include a first region where an orthographic projection of the cavity 13 on the substrate 10 falls and a second region surrounding the first region, and in the second region, at least a portion of the vibrating film 14 and at least a portion of the insulating layer 12 are in direct contact with each other, as shown in FIGS. 1A and 1B. In one embodiment, the cavity 13 may be surrounded only by the photoresist material. In other words, when the insulating layer 12 is made of a photoresist material, the top, bottom and side surfaces of the cavity 13 are all made of photoresist such as the DL-1000-C photoresist and the SU8 photoresist.

In addition, in one embodiment, as shown in FIGS. 1A and 1B, the ultrasonic transducer unit may further include a first electrode lead 16 arranged on the substrate 10 in a same layer as the first electrode 11, and electrically connected to the first electrode 11 for leading the first electrode 11 to the outside so as to apply an electrical signal to the first electrode 11 when the ultrasonic transducer unit is operated. There may be a via hole penetrating through the vibrating film 14 and the insulating layer 12 on the first electrode lead 16 for connecting the first electrode lead 16 to an external signal line.

Figure 1C:
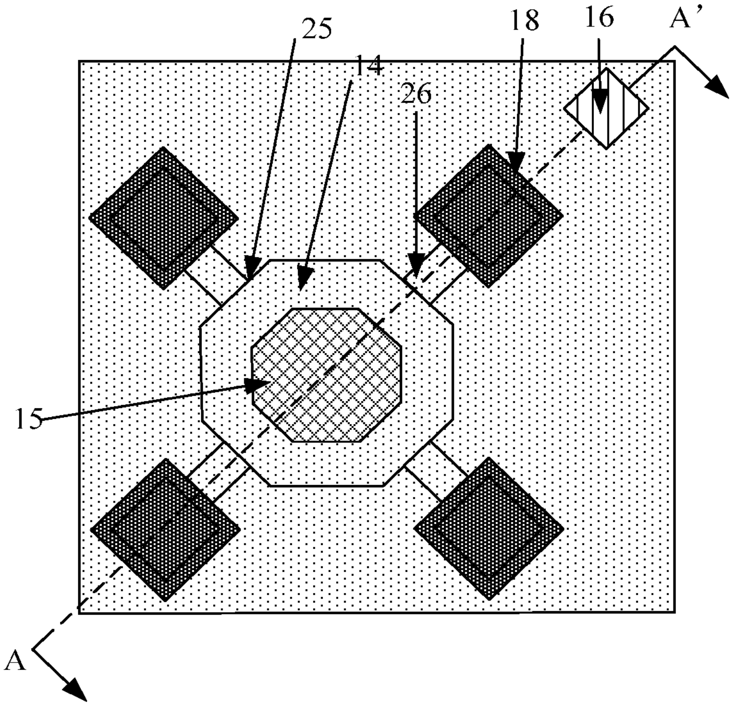
FIG. 1C shows a top view of an ultrasonic transducer unit according to an embodiment of the present disclosure.
Figure 1D:
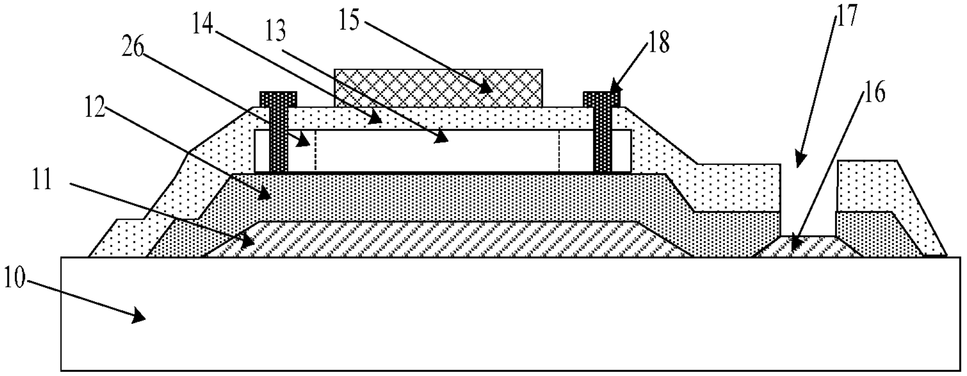
FIG. 1D shows a schematic cross-sectional view of an ultrasonic transducer unit according to an embodiment of the present disclosure.

FIGS. 1C and 1D respectively show a top view and a schematic cross-sectional view of an ultrasonic transducer unit according to an embodiment of the present disclosure, wherein FIG. 1D is a cross-sectional view taken along a line AN shown in FIG. 1C. Unlike the embodiment shown in FIGS. 1A and 1B, the cavity 13 of the ultrasonic transducer unit shown in FIGS. 1C and 1D includes a central portion 25 and one or more connecting portions 26 extending outward from the central portion 25 as branches thereof, wherein a via hole penetrating through the vibrating film 14 so as to communicate with the cavity 13 and a filling pattern 18 filling the via hole are provided on the connecting portion 26 (i.e. a region outside the central portion 25). This structure can reduce the influence of the filling pattern 18 on the vibration of the vibrating film 14, and thus has a better vibration performance.

The orthographic projection of the cavity on the substrate of the embodiment shown in FIGS. 1A and 1B is hexagonal, and the orthographic projection of the central portion 25 of the cavity on the substrate of the embodiment shown in FIGS. 1C and 1D is hexagonal, but the present disclosure is not limited thereto. For example, the orthographic projection of the cavity on the substrate 1 may be square or circular.

Figure 2:
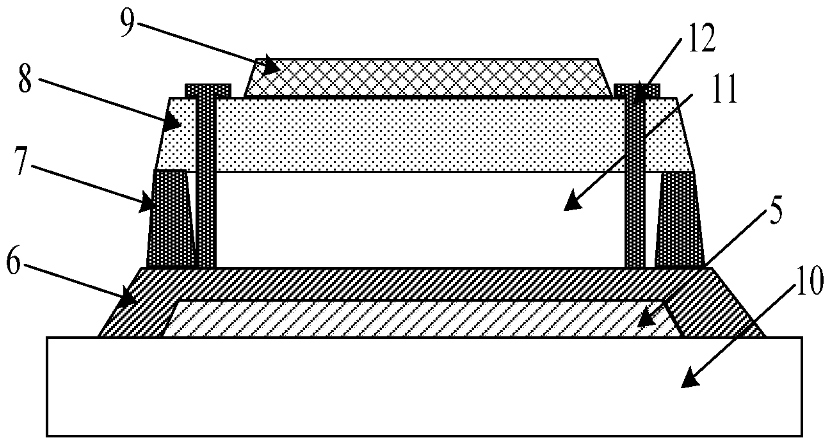
FIG. 2 is a schematic view showing a structure of an ultrasonic transducer unit according to an embodiment of the present disclosure.

FIG. 2 shows a schematic cross-sectional view of an ultrasonic transducer unit according to an embodiment of the present disclosure. As shown in FIG. 2, in this embodiment, the ultrasonic transducer unit includes a first electrode 5, an insulating layer 6, a vibrating film 8, and a second electrode 9 provided on a substrate 10. Unlike the embodiments shown in FIGS. 1A to 1D, in this embodiment, a vibrating cavity is enclosed by a support pattern 7 (for example, a ring-shaped hollow support pattern 7), an orthographic projection of the cavity on the substrate 10 is a first region, the substrate 10 further includes a second region, and the second region surrounds the first region, as shown in FIG. 2, the support pattern 7 is located in the second region. The vibrating film 8 is formed on the support pattern 7 to close the vibrating cavity, thereby forming a closed cavity 11. The ultrasonic transducer unit further includes a via hole that penetrates through the vibrating film 8 to communicate with the cavity and a filling pattern 12 formed in the via hole.

In this embodiment, a material of the vibrating film 8 is a photoresist, such as the DL-1000-C photoresist or the SU8 photoresist. Compared with the conventional ultrasonic transducer unit adopting the vibrating film made of silicon nitride and/or silicon oxide, the vibrating film made of the photoresist material according to the present disclosure has better ductility, and can adopt a thicker photoresist layer under a certain frequency, so that the vibrating film is more reliable and is not easy to damage during repeated vibration when the ultrasonic transducer unit is operated. In addition, in this embodiment, a material of each of the insulating layer 6 and the support pattern 7 may also be a photoresist, such as the DL-1000-C photoresist or the SU8 photoresist.

In the embodiment, when the material of the vibrating film is the DL-1000-C photoresist, the thickness of the vibrating film is greater than or equal to 1.5 μm and less than or equal to 3 μm; when the material of the vibrating film is the SU8 photoresist, the thickness thereof is greater than or equal to 5 μm and less than or equal to 40 μm. The material of the insulating layer may be the DL-1000-C photoresist, and the thickness of the insulating layer is greater than or equal to 1.5 μm and less than or equal to 3 μm; alternatively, the material of the insulating layer may be the SU8 photoresist, and the thickness of the insulating layer is greater than or equal to 5 μm and less than or equal to 40 μm.

Other configurations of the embodiment shown in FIG. 2 are the same as those of the embodiment shown in FIGS. 1A and 1B, and are not repeated herein. In one embodiment, the ultrasonic transducer unit may further include an electrode lead arranged on the substrate 10 in a same layer as the first electrode 5 and electrically connected to the first electrode 5, for leading the first electrode 5 to the outside, so as to apply an electrical signal to the first electrode 5 when the ultrasonic transducer unit is operated.

Figure 3:
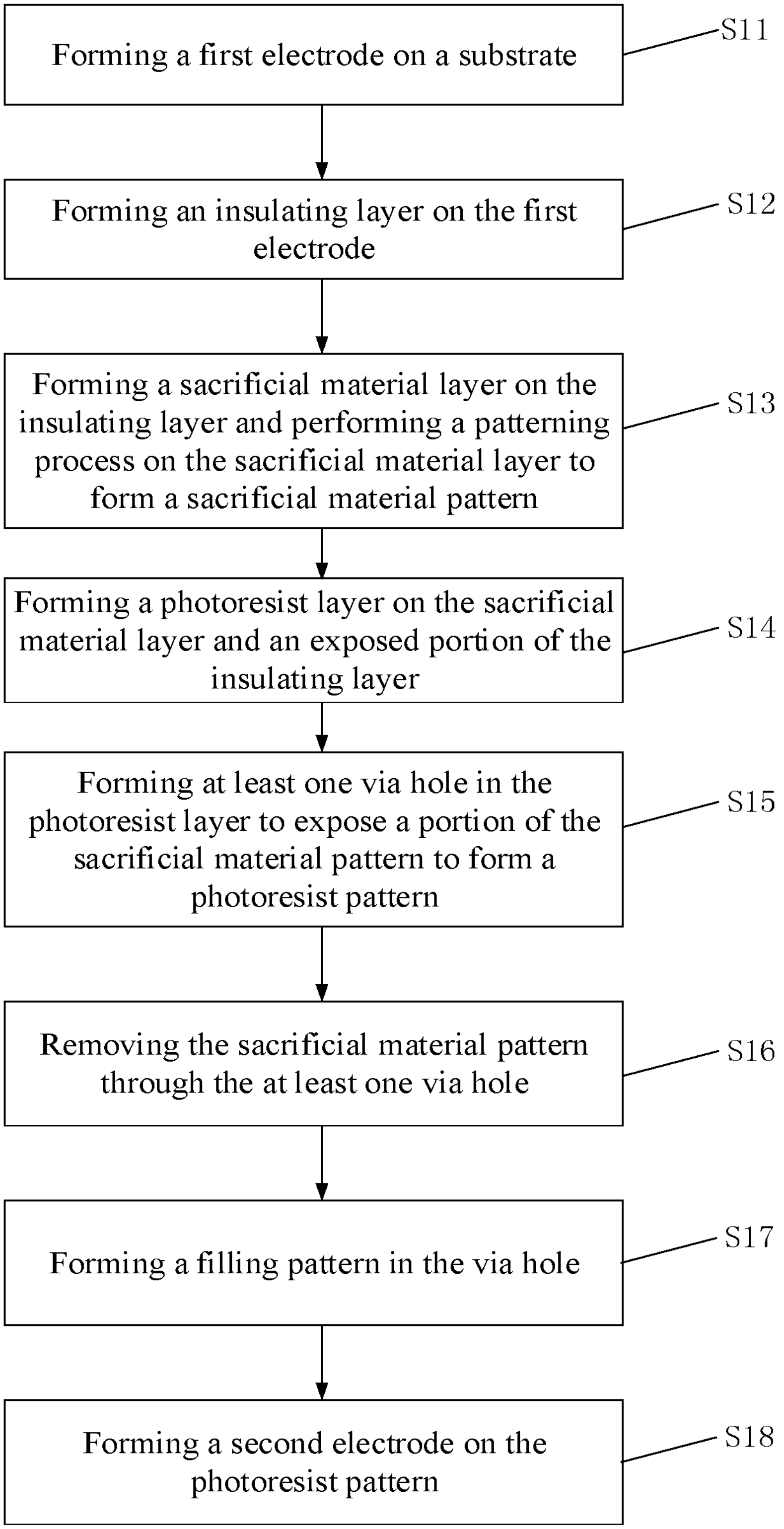
FIG. 3 is a flow chart illustrating a method for manufacturing an ultrasonic transducer unit according to an embodiment of the present disclosure.

FIG. 3 shows a flow chart illustrating a method for manufacturing an ultrasonic transducer unit according to an embodiment of the present disclosure. The method includes the following steps S11 to S18.

In step S11, a first electrode is formed on a substrate, a material of the first electrode being, for example, AlNd or Au.

In step S12, an insulating layer is formed on the first electrode.

In one embodiment, the insulating layer may be formed by using a non-metal material such as silicon nitride and/or silicon oxide. For example, an insulating material layer may be formed on the substrate on which the first electrode is formed; a photoresist layer may be formed on the insulating material layer; an exposure process, by using a mask plate, and a development process are performed on the photoresist layer to form a photoresist pattern; and the insulating material layer is etched to form an insulating layer, and the photoresist pattern is removed.

In one embodiment, the insulating layer may alternatively be formed by using a photoresist material such as the DL-1000-C photoresist or the SU8 photoresist. For example, a photoresist material layer of the DL-1000-C photoresist or the SU8 photoresist is directly coated on the substrate on which the first electrode is formed; and an exposure process, by using a mask plate, and a development process are performed on the photoresist material layer to form a photoresist pattern as an insulating layer. When the insulating layer is formed by adopting a photoresist material such as the DL-1000-C photoresist or the SU8 photoresist, post-baking treatment is performed on the photoresist pattern formed after the exposure and development processes, so that the formed insulating layer is resistant to corrosion by an acid, to cleaning by alcohol, acetone and the like, and to photoresist removing liquids, thereby avoiding being damaged in a subsequent process. For the DL-1000-C photoresist, the photoresist can be modified by post-baking at 200° C. to 300° C. for about 1 hour, so that the post-baked DL-1000-C photoresist is acid-resistant and acetone-resistant; the SU8 photoresist can be denatured (i.e., modified), for example, by post-baking at 90° C. to 100° C. for about 2 minutes to 6 minutes, so that the post-baked SU8 photoresist is acid-resistant and acetone-resistant. After the post-baking treatment, the adverse effect of the subsequent patterning process on the formed insulating layer can be avoided.

In step S13, a sacrificial material pattern is formed on the insulating layer in a region overlapping with the first electrode, and a portion of the insulating layer is exposed by the sacrificial material pattern. In one embodiment, a sacrificial material pattern 200 may be formed using a metal material such as Mo and AlNd, and the thickness of the sacrificial material pattern will determine the thickness of the cavity, as shown in FIG. 4A.

Figure 4A:
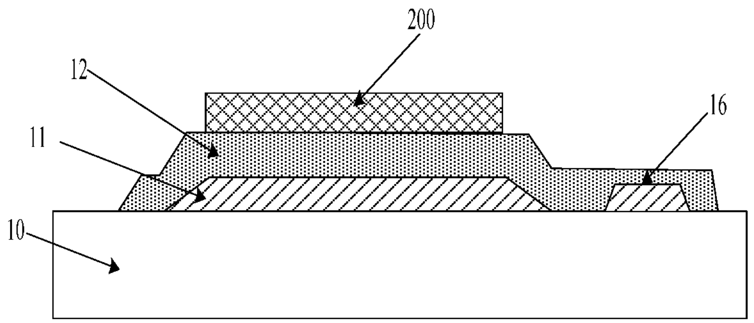
FIGS. 4A to 4F are schematic views illustrating structures obtained during a method for manufacturing an ultrasonic transducer unit according to an embodiment of the present disclosure.
Figure 4B:
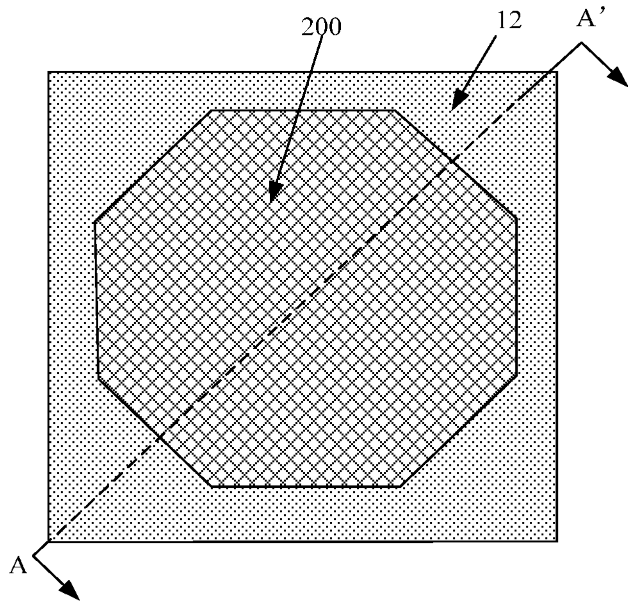

In one embodiment, a metal material layer of Mo, AlNd or the like is first formed on the substrate formed with the insulating layer 12; a photoresist, such as an AZ5214 or AZ4620 series photoresist, is then coated on the metal material layer, and then an exposure process, by using a mask plate, and a development process are performed on the photoresist; the metal material layer is etched to form a sacrificial material pattern 200, which partially overlaps with the first electrode 11, as shown in FIGS. 4A and 4B.

Figure 4C:
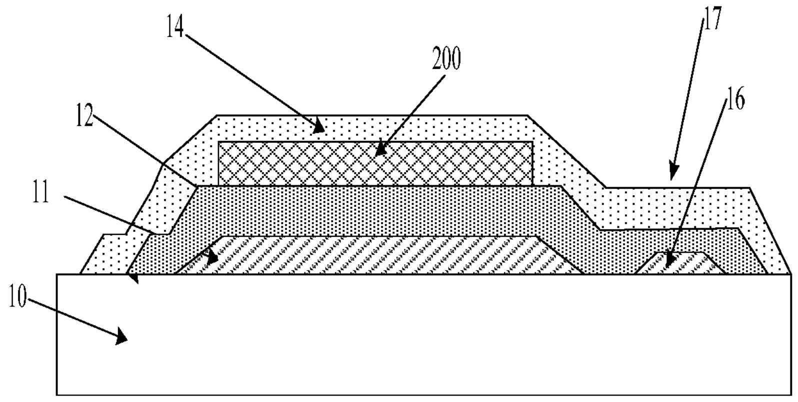
Figure 4D:
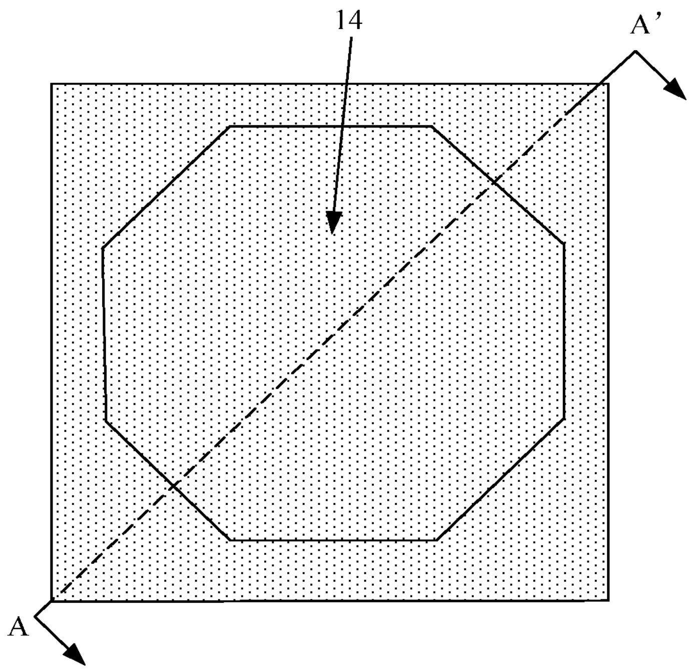

In step S14, a photoresist layer is formed on the sacrificial material pattern and the exposed portion of the insulating layer. For example, the photoresist layer may be formed to completely cover the sacrificial material pattern and to cover the exposed portion of the insulating layer, as shown in FIGS. 4C and 4D. In one embodiment, the photoresist layer may be formed using, for example, the DL-1000-C photoresist or the SU8 photoresist, and the thickness of the photoresist layer made of the DL-1000-C photoresist may be in a range between 1.5 μm or more and 3 μm or less; and if the SU8 photoresist is used, the thickness of the photoresist layer can be greater than or equal to 5 μm and less than or equal to 40 μm. In this embodiment, the photoresist layer is directly formed on the sacrificial material pattern 200, to cover the lateral and front surfaces of the sacrificial material layer 200, so as to completely cover the sacrificial material pattern 200.

Figure 4E:
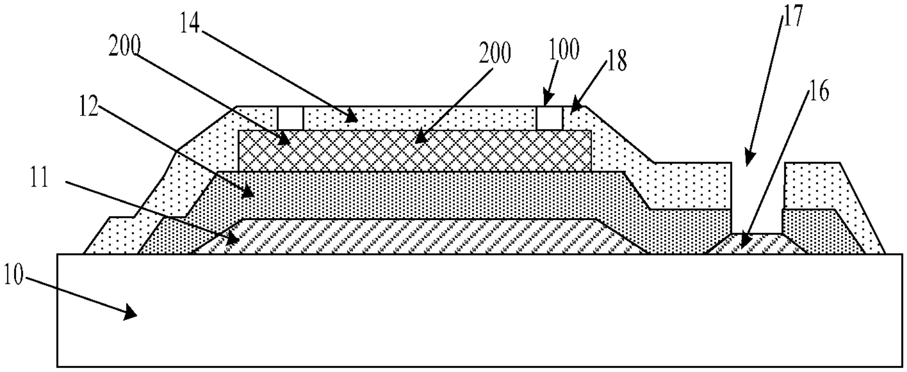

In step S15, at least one via hole exposing a portion of the sacrificial material pattern is formed in the photoresist layer to form a photoresist pattern, and then a post-baking process is performed on the photoresist pattern, thereby forming a vibrating film. As shown in FIG. 4E, for example, a via hole 100 penetrating through the photoresist layer 14 is formed in the photoresist layer 14. Specifically, the photoresist layer 14 is exposed, by using a mask plate, and developed to form at least one via hole each as a corrosion hole, exposing a portion of the sacrificial material layer 200, so that the cavity 13 is formed by subsequently removing the sacrificial material layer 200 through the at least one via hole. When the SU8 photoresist or the DL-1000-C photoresist is used for forming the vibrating film, a photoresist layer with a pattern of a specific filling hole is formed after being subjected to the exposure and development processes, and after the post-baking treatment, the formed photoresist pattern is resistant to acid corrosion, resistant to cleaning by alcohol, acetone and the like, and resistant to photoresist removing liquids. This step may also simultaneously form a via hole 17 penetrating through the vibrating film 14 and the insulating layer 12 to expose the first electrode lead 16, as shown in FIG. 4E.

Figure 4F:
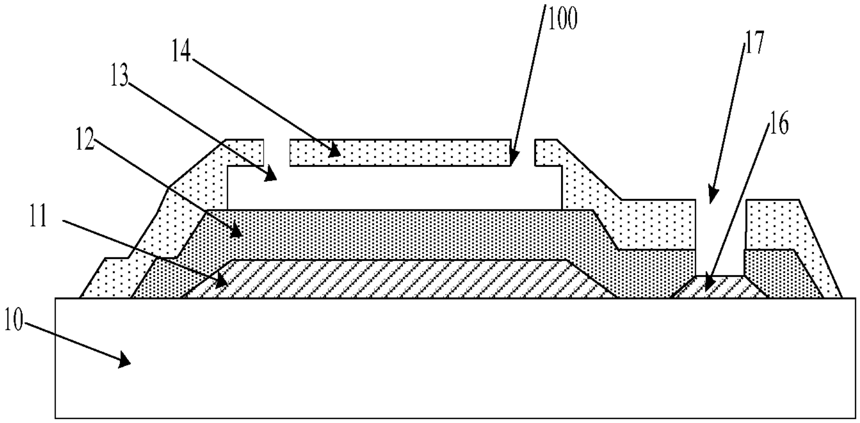

In step S16, the sacrificial material pattern is removed through the at least one via hole. In one embodiment, the sacrificial material pattern made of a sacrificial material such as Mo and AlNd, may be removed, for example, through the via hole 100 using a corrosion solution including sulfuric acid and/or phosphoric acid, as shown in FIG. 4F.

In step S17, a filling pattern is formed in the via hole. The material of the filling pattern may be, for example, amorphous silicon, as shown in FIG. 1.

In step S18, a second electrode is formed on the photoresist pattern in a region overlapping with the first electrode.

In the present disclosure, when the first electrode or the second electrode is formed, a metal layer, such as AlNd and Au, may be coated, and then a photoresist, such as the AZ5214 photoresist or the AZ4620 photoresist, may be coated on the metal layer, a pattern of the first electrode or the second electrode is formed through exposure and development processes, and then the photoresist used herein may be removed using acetone and the like, without any influence or damage to the vibrating film and the insulating layer.

As shown in FIG. 4A, the method further includes forming a first electrode lead 16 on the substrate 10 at the same time as forming the first electrode 11 on the substrate 10, the first electrode lead 16 being electrically connected to the first electrode 11 for connecting the first electrode 11 to an external signal line to apply an electrical signal to the first electrode 11. In addition, while the via hole is formed by performing the exposure and development processes on the photoresist layer for forming the vibrating film, the method may further include forming a via hole 17 penetrating through the insulating layer 12 and the vibrating film 14 to expose the first electrode lead 16 for connecting the first electrode lead 16 to the external signal line.

In one embodiment, when each of the insulating layer and the vibrating film is made of a photoresist, the side surface and the top surface of the cavity of the formed ultrasonic transducer unit are all made of the photoresist, and the vibrating film of the formed ultrasonic transducer unit is more reliable during repeated vibration when the ultrasonic transducer unit is operated due to the good ductility of the photoresist.

The ultrasonic transducer unit manufactured as above includes the insulating layer, but the ultrasonic transducer unit of the present disclosure may not include the above-described insulating layer. In this case, the method for manufacturing the ultrasonic transducer unit may include forming a sacrificial material pattern directly on the first electrode and then forming a photoresist pattern used as a vibrating film on the sacrificial material pattern. Other steps are similar to the above steps, and are not described herein again.

Figure 5:
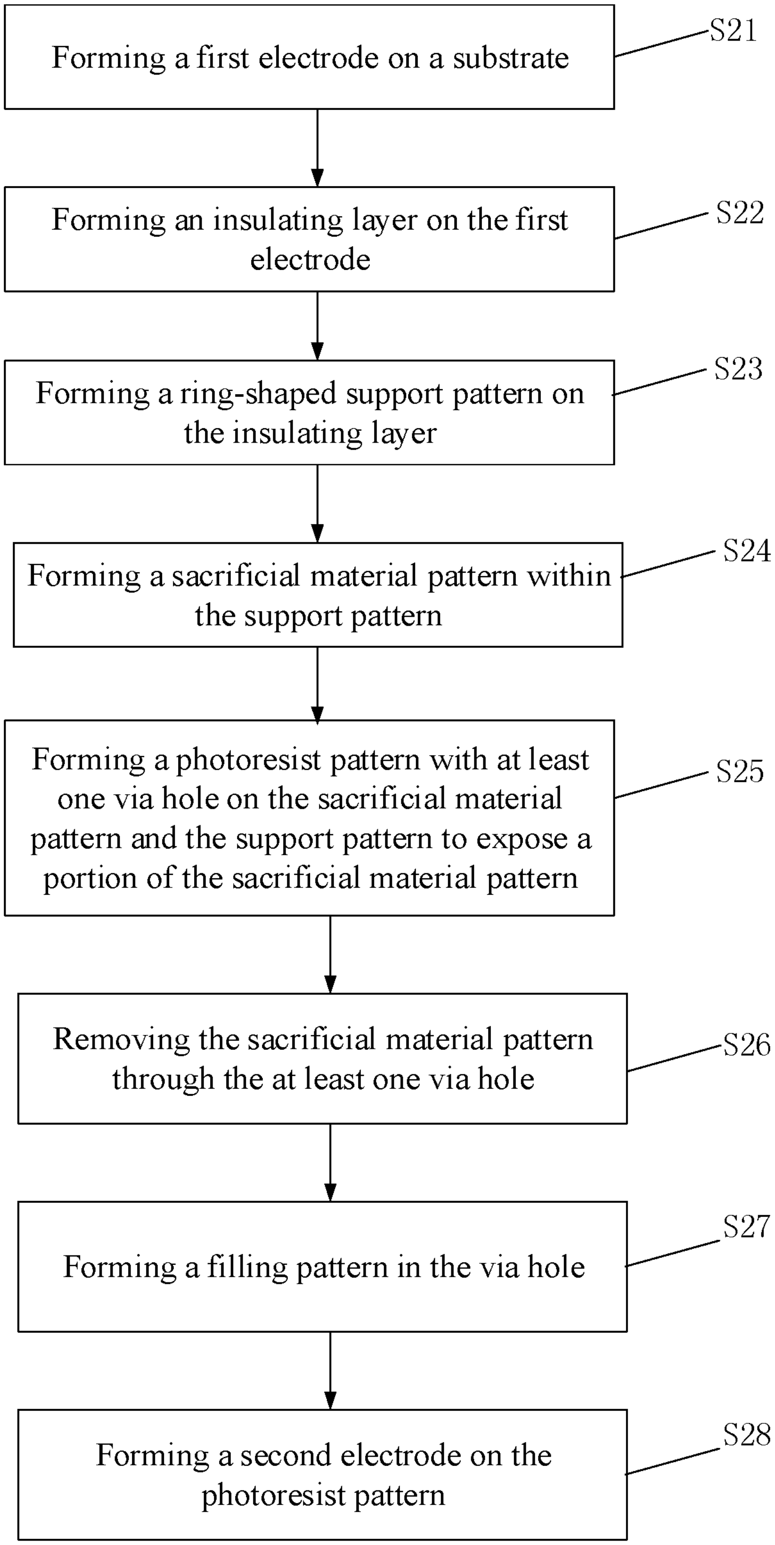
FIG. 5 is a flow chart illustrating a method for manufacturing an ultrasonic transducer unit according to an embodiment of the present disclosure.

FIG. 5 shows a flow chart illustrating a method for manufacturing an ultrasonic transducer unit according to an embodiment of the present disclosure. The method includes the following steps S21 to S28.

In step S21, a first electrode is formed on a substrate, a material of the first electrode being, for example, AlNd or Au.

In step S22, an insulating layer is formed on the first electrode.

In one embodiment, the insulating layer may be formed using a non-metal material such as silicon nitride and/or silicon oxide. For example, an insulating material layer may be formed on the substrate on which the first electrode is formed, a photoresist layer is formed on the insulating material layer; an exposure process, by using a mask plate, and a development process are performed on the photoresist layer to form a photoresist pattern; and the insulating material layer is etched to form the insulating layer, and then the photoresist pattern is removed.

In one embodiment, the insulating layer may alternatively be formed by using a photoresist material such as the DL-1000-C photoresist or the SU8 photoresist. For example, a photoresist material layer of the DL-1000-C photoresist or the SU8 photoresist is directly coated on the substrate on which the first electrode is formed; and an exposure process, by using the mask plate, and a development process are performed on the photoresist layer to form a photoresist pattern as an insulating layer. When the insulating layer is formed by adopting a photoresist material such as the DL-1000-C photoresist or the SU8 photoresist, post-baking treatment is performed on the patterned insulating layer formed after the exposure and development processes are performed, so that the formed photoresist pattern is resistant to acid corrosion, resistant to cleaning by alcohol, acetone and the like, and resistant to photoresist removing liquids, thereby avoiding being damaged in a subsequent process.

Figure 6:
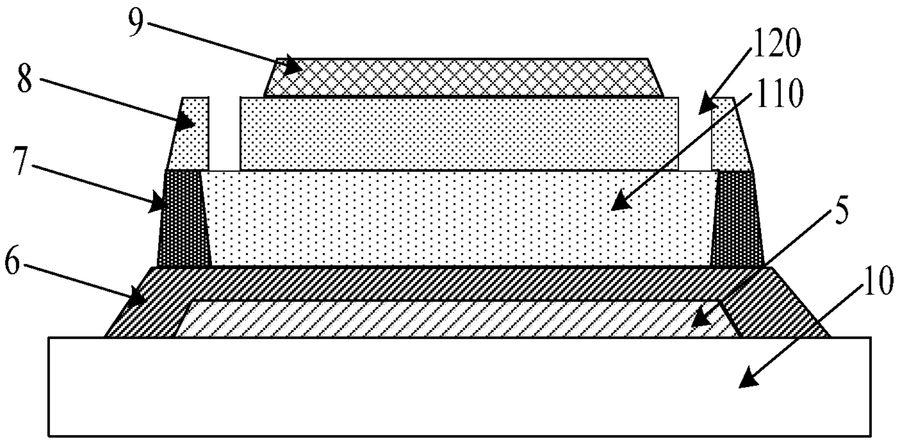
FIG. 6 is a schematic view showing a structure obtained during a method for manufacturing an ultrasonic transducer unit according to an embodiment of the present disclosure.

In step S23, a ring-shaped support pattern is formed on the insulating layer. In this step, a ring-shaped support pattern 7 is formed as shown in FIG. 6. For example, a circular or polygonal ring-shaped support pattern may be formed, the support pattern 7 defining a region on the substrate where a closed cavity is to be formed, a height of the support pattern determining a height (e.g., 140 nm to 400 nm) of the cavity to be formed, and an area of the support pattern determining a size of the cavity. A material of the support pattern should be chosen to be compatible with the process used to etch away the sacrificial material within the support pattern to form the cavity, and in this embodiment, a photoresist such as the DL-1000-C photoresist and the SU8 photoresist may alternatively be chosen as the material of the support pattern. This embodiment is different from the embodiment shown in FIGS. 4A to 4E in that the support pattern 7 for defining the size of the cavity 13 is separately formed, improving a freedom degree of manufacturing the ultrasonic transducer unit.

In step S24, a sacrificial material pattern is formed in the ring-shaped support pattern. In one embodiment, a sacrificial material pattern 110 may be formed using a metal material such as Mo or AlNd, and a thickness of the sacrificial material pattern 110 will determine a thickness of the cavity, as shown in FIG. 6. When a metal such as Mo or AlNd is used as the sacrificial material, a photoresist may also be selected as the material of the support pattern 7. That is, the same material may be selected to form the insulating layer 6, the support pattern 7, and the vibrating film 8 to be formed later. For example, the SU8 photoresist or the DL-1000-C photoresist may be used to form a support pattern layer, which is exposed and developed to form the ring-shaped support pattern 7, and then after being subjected to a post-baking treatment, the formed support pattern 7 is resistant to acid corrosion, resistant to cleaning by alcohol, acetone and the like, and resistant to photoresist removing liquids, so as to avoid being damaged in a subsequent process.

In step S25, a photoresist pattern with at least one via hole exposing a portion of the sacrificial material pattern is formed on the sacrificial material pattern and the support pattern, and then a post-baking process is performed on the photoresist pattern to form a vibrating film. In one embodiment, in this step, a photoresist layer may be formed using, for example, the DL-1000-C photoresist or the SU8 photoresist, and the thickness of the photoresist layer made of the DL-1000-C photoresist may be in a range between 1.5 μm or more and 3 μm or less; and if the SU8 photoresist is used, the thickness of the photoresist layer may be greater than or equal to 5 μm and less than or equal to 40 μm. The photoresist layer may be exposed by using a mask plate and developed to form a pattern of the vibrating film 8 as shown in FIG. 6. When the SU8 photoresist or the DL-1000-C photoresist is used for forming the vibrating film, a photoresist pattern with at least one via hole 120 may be formed after the photoresist layer is exposed and developed, and after a post-baking treatment is performed, the formed vibrating film is resistant to acid corrosion, resistant to cleaning by alcohol, acetone and the like, and resistant to photoresist removing liquids.

In step S26, the sacrificial material pattern is removed through the at least one via hole. In one embodiment, a sacrificial material made of a metal such as Mo or AlNd, may be removed, e.g., by using sulfuric acid and/or phosphoric acid, through the via hole 120.

In step S27, a filling pattern is formed in the via hole. A material of the filling pattern may be, for example, amorphous silicon, as shown in FIG. 2.

In step S28, a second electrode is formed on the vibrating film in a region overlapping with the first electrode.

In the present disclosure, when the first electrode or the second electrode is formed, a metal layer, such as AlNd or Au, is coated, and then, a photoresist, such as the AZ5214 photoresist or the AZ4620 photoresist, may be coated on the metal layer, a pattern of the first electrode or the second electrode is formed through exposure and development processes, and then, the photoresist used herein may be removed using a solution, such as acetone, without any influence or damage to the vibrating film and the insulating layer.

As described above, in the present disclosure, a photoresist material, such as the DL-1000-C photoresist or the SU8 photoresist, is used as a material for the vibrating film of the ultrasonic transducer unit. Compared with the prior art in which the vibrating film is formed by adopting silicon nitride and/or silicon oxide, the vibrating film made of the photoresist material has a better ductility, and in order to obtain a certain working frequency, a thicker photoresist material can be adopted, so that the vibrating film is more reliable in repeated vibration during operation and is not easy to damage.

In addition, in the method for manufacturing the ultrasonic transducer unit, when the vibrating film is formed, only steps of coating, exposing, developing and then baking the photoresist are needed to form a required pattern of the vibrating film. For example, the pattern of the vibrating film is formed with at least one via hole which is directly communicated with the sacrificial material pattern. Therefore, compared with the prior art in which when the vibrating film made of silicon nitride and/or silicon oxide is formed, the pattern of the vibrating film is formed by firstly forming the silicon nitride and/or silicon oxide material layer, coating a photoresist, exposing and developing the photoresist, and etching the silicon nitride and/or silicon oxide material layer, the method for manufacturing the ultrasonic transducer unit of the present disclosure is simpler and requires fewer processes. In addition, the insulating layer in the present disclosure may alternatively be formed using the same photoresist of which the vibrating film is made, which may further reduce manufacturing complexity and processes.

It should be understood that, the above embodiments are merely exemplary embodiments employed to illustrate the principles of the present disclosure, and the present disclosure is not limited thereto. It will be apparent to a person skilled in the art that, various changes and modifications can be made therein without departing from the spirit and scope of the disclosure, and these changes and modifications are to be considered within the scope of the disclosure.

What is claimed is:

1. An ultrasonic transducer unit, comprising:

a substrate;

a first electrode on the substrate;

a vibrating film on the first electrode; and a second electrode on the vibrating film, wherein an overlapping region exists between an orthographic projection of the first electrode on the substrate and an orthographic projection of the second electrode on the substrate, and a closed cavity is formed between the vibrating film and the first electrode in the overlapping region, wherein the ultrasonic transducer unit further comprises an insulating layer between the first electrode and the cavity, and a bottom surface, a top surface and a side surface of the closed cavity are all made of photoresist.

2. The ultrasonic transducer unit according to claim 1, further comprising:

at least one via hole penetrating through the vibrating film and communicating with the cavity, and a filling pattern filling the via hole.

3. The ultrasonic transducer unit according to claim 1, wherein the photoresist comprises a DL-1000-C photoresist or a SU8 photoresist.

4. The ultrasonic transducer unit according to claim 3, wherein the material of the vibrating film is the DL-1000-C photoresist, and a thickness of the vibrating film is greater than or equal to 1.5 μm and less than or equal to 3 μm; or the material of the vibrating film is the SU8 photoresist, and a thickness of the vibrating film is greater than or equal to 5 μm and less than or equal to 40 μm.

5. The ultrasonic transducer unit according to claim 4, wherein a material of the insulating layer is the DL-1000-C photoresist, and a thickness of the insulating layer is greater than or equal to 1.5 μm and less than or equal to 3 μm; or a material of the insulating layer is the SU8 photoresist, and a thickness of the insulating layer is greater than or equal to 5 μm and less than or equal to 40 μm.

6. The ultrasonic transducer unit according to claim 2, wherein a material of the filling pattern is amorphous silicon.

7. The ultrasonic transducer unit according to claim 1, further comprising a first electrode lead on the substrate and in a same layer as the first electrode, and electrically connected to the first electrode.

8. The ultrasonic transducer unit according to claim 1, wherein an orthographic projection of the cavity on the substrate is at a first region of the substrate, and the substrate further comprises a second region surrounding the first region, and at least a portion of the vibrating film and at least a portion of the insulating layer are in direct contact with each other in the second region; or the ultrasonic transducer unit further comprises a support pattern which is between the vibrating film and the insulating layer and is in the second region.

9. The ultrasonic transducer unit according to claim 8, wherein a material of the support pattern comprises a photoresist.

10. A method for manufacturing an ultrasonic transducer unit, comprising:

forming a first electrode on a substrate;

forming a sacrificial material pattern on the first electrode;

forming a photoresist pattern on the sacrificial material pattern, wherein an overlapping region exists between an orthographic projection of the photoresist pattern on the substrate and an orthographic projection of the first electrode on the substrate;

removing the sacrificial material pattern such that a closed cavity is formed between the photoresist pattern and the first electrode in the overlapping region; and forming a second electrode on the photoresist pattern such that an orthographic projection of the second electrode on the substrate at least partially overlaps with the overlapping region; and wherein the forming the sacrificial material pattern on the first electrode comprises:

forming a first photoresist layer on the first electrode;

performing exposure, development and post-baking treatment on the first photoresist layer by using a mask plate to form an insulating layer; and forming the sacrificial material pattern on the insulating layer at least in the overlapping region, and wherein a bottom surface, a top surface and a side surface of the closed cavity are all made of photoresist.

11. The method according to claim 10, wherein a material of the photoresist pattern comprises a DL-1000-C photoresist or a SU8 photoresist.

12. The method according to claim 10, wherein the forming a photoresist pattern on the sacrificial material pattern comprises:

forming a second photoresist layer on the sacrificial material pattern and on an exposed portion of the insulating layer; and performing exposure, development and post-baking treatment on the second photoresist layer by using a mask plate to form the photoresist pattern with at least one via hole penetrating through the second photoresist layer.

13. The method according to claim 12, wherein the removing the sacrificial material pattern comprises:

removing the sacrificial material pattern through the at least one via hole; and forming a filling pattern in the via hole.

14. The method according to claim 11, wherein an orthographic projection of the cavity on the substrate is in a first region of the substrate, the substrate further comprises a second region surrounding the first region, and the forming a sacrificial material pattern on the first electrode comprises:

forming a first photoresist layer on the first electrode;

performing exposure, development and post-baking treatment on the first photoresist layer by using a mask plate to form an insulating layer;

forming a third photoresist layer on the insulating layer, and performing exposure, development and post-baking treatment on the third photoresist layer to form a support pattern in the second region; and forming the sacrificial material pattern within the support pattern.

15. The method according to claim 14, wherein the method further comprises forming a first electrode lead in a same layer as the first electrode and electrically connected to the first electrode on the substrate while forming the first electrode on the substrate.

16. The method according to claim 15, wherein the sacrificial material pattern comprises a metal pattern of Mo or AlNd; and the removing the sacrificial material pattern comprises removing the metal pattern of Mo or AlNd using phosphoric acid and/or sulfuric acid.

17. The method according to claim 10, wherein a material of the insulating layer comprises a DL-1000-C photoresist or a SU8 photoresist.

18. The method according to claim 14, wherein a material of the support pattern comprises a DL-1000-C photoresist or a SU8 photoresist.

* * * * *